US010996628B2

(12) United States Patent
Yoon (10) Patent No.: US 10,996,628 B2
(45) Date of Patent: May 4, 2021

(54) APPARATUS AND METHOD FOR EVALUATING HOLOGRAM ENCODING/HOLOGRAPHIC IMAGE QUALITY FOR AMPLITUDE-MODULATION HOLOGRAM

(71) Applicant: ELECTRONICS AND TELECOMMUNICATIONS RESEARCH INSTITUTE, Daejeon (KR)

(72) Inventor: Minsung Yoon, Gumi (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 2 days.

(21) Appl. No.: 16/191,307

(22) Filed: Nov. 14, 2018

(65) Prior Publication Data
US 2019/0332055 A1 Oct. 31, 2019

(30) Foreign Application Priority Data
Apr. 30, 2018 (KR) ........................ 10-2018-0050124

(51) Int. Cl.
G03H 1/26 (2006.01)

(52) U.S. Cl.
CPC ......... *G03H 1/268* (2013.01); *G03H 2225/31* (2013.01); *G03H 2226/02* (2013.01)

(58) Field of Classification Search
None
See application file for complete search history.

(56) References Cited

U.S. PATENT DOCUMENTS

| 4,974,920 A * | 12/1990 | Chovan ................... G03H 1/00 359/1 |
| 5,024,508 A * | 6/1991 | Horner ................... G02B 27/46 359/29 |
| 5,064,257 A | 11/1991 | Shinoda et al. |
| 5,119,214 A * | 6/1992 | Nishii ....................... G03H 1/02 359/7 |
| 5,416,618 A * | 5/1995 | Juday ....................... G02F 3/00 349/1 |
| 9,703,260 B2 * | 7/2017 | Ayres ................... G11B 7/1362 |

(Continued)

OTHER PUBLICATIONS

You Seok Kim et al., "Speckle-Free Digital Hologram with Conversion to Off-Axis Horizontal-Parallax-Only Hologram", Korean Journal of Optics and Photonics, Apr. 2014, pp. 85-89, vol. 25, No. 2.

*Primary Examiner* — Tyler W. Sullivan (57) ABSTRACT

Provided is an apparatus and method for encoding a hologram and evaluating a holographic image quality for an amplitude-modulated hologram. A hologram encoding method may include acquiring three-dimensional (3D) information of a scene or an object; generating hologram information based on the 3D information; deriving a real number hologram function by extracting a real number part and an imaginary number part from the hologram information; determining an intermediate hologram function based on a sign characteristic of the real number hologram function; and determining encoded hologram information based on the intermediate hologram function.

7 Claims, 8 Drawing Sheets

(56) References Cited

U.S. PATENT DOCUMENTS

| | | | |
|---|---|---|---|
| 2005/0088712 A1* | 4/2005 | Young | G03H 1/0841 359/9 |
| 2006/0250671 A1* | 11/2006 | Schwerdtner | G03H 1/2286 359/9 |
| 2010/0033781 A1* | 2/2010 | Leister | G03H 1/2294 359/9 |
| 2011/0228365 A1* | 9/2011 | Tsang | G03H 1/26 359/9 |
| 2014/0085692 A1* | 3/2014 | Lee | G03H 1/2202 359/23 |
| 2015/0077818 A1* | 3/2015 | Tsang | G03H 1/0841 359/9 |
| 2015/0131133 A1* | 5/2015 | Tsang | G03H 1/0808 359/9 |
| 2015/0277377 A1* | 10/2015 | Tsang | G03H 1/0841 348/40 |
| 2016/0187850 A1 | 6/2016 | Oh | |
| 2016/0320752 A1* | 11/2016 | Seo | G03H 1/0841 |
| 2017/0038727 A1 | 2/2017 | Kim et al. | |
| 2017/0148151 A1 | 5/2017 | Oh et al. | |
| 2018/0259904 A1* | 9/2018 | Georgiou | G03H 1/02 |
| 2019/0187614 A1* | 6/2019 | Oh | G03H 1/2294 |
| 2019/0196402 A1* | 6/2019 | Leister | G02B 27/58 |
| 2020/0105498 A1* | 4/2020 | Harada | G03H 5/00 |

* cited by examiner

APPARATUS AND METHOD FOR EVALUATING HOLOGRAM ENCODING/HOLOGRAPHIC IMAGE QUALITY FOR AMPLITUDE-MODULATION HOLOGRAM

CROSS-REFERENCE TO RELATED APPLICATION(S)

This application claims the priority benefit of Korean Patent Application No. 10-2018-0050124 filed on Apr. 30, 2018, in the Korean Intellectual Property Office, the disclosure of which is incorporated herein by reference for all purposes.

BACKGROUND

1. Field

One or more example embodiments relate to technology for producing and processing full stereo holographic image content based on optical wave interference, and more particularly, to an apparatus and method for encoding a hologram or evaluating a holographic image quality for an amplitude-modulated hologram.

2. Description of Related Art

Holographic display technology refers to ideal full-realization three-dimensional (3D) display technology that may three-dimensionally represent an object in a 3D space. In detail, the holographic display technology may reproduce a wave-front occurring due to a given object as is and may achieve an effect as if the object is actually present in an eye of a user.

Currently, with the development of 3D display technology, an object may be represented with a perfect parallax and depth and a user may not experience eye fatigue and dizziness occurring due to accommodation-convergence mismatch accordingly.

However, the 3D display technology according to the related art has some issues in that it is difficult to perform image processing in real time and to perform optical reconstruction since an amount of information increases since 360-degree image content for holography is generated based on various real objects or computer graphics.

As described above, an operation processing amount may increase according to an increase in an information amount. Due to such a burden, a method of reconstructing an existing image may be frequently used rather than generating new 360-degree image content for holography. Thus, a viewer may passively observe content.

Although the new 360-degree image content for holography is generated, holographic terminals or spatial light modulators (SLMs) configured to display such 360-degree image content for holography are configured on an optical table since a system volume is great due to a complex optical system for generating a light with uniform intensity and excellent coherence.

Accordingly, there is a need for a method of encoding hologram information to reconstruct hologram content using an amplitude-modulation (AM) SML includable in a holographic terminal in a mobile type or a wearable type around a user face or the user may easily hold with a hand.

SUMMARY

At least one example embodiment provides an apparatus and method that may produce and provide optimal high quality hologram content in a modified amplitude-only (MAO) holographic terminal system by determining encoded hologram information using a real number hologram function that is a result of extracting a real number part from hologram information, or a function transformed from the real number hologram function.

At least one example embodiment also provides an apparatus and method that may measure an image quality of a reconstructed three-dimensional (3D) hologram by capturing and analyzing a reconstructed holographic image.

According to an aspect of at least one example embodiment, there is provided an amplitude-modulated (AM) hologram encoding method including acquiring three-dimensional (3D) information of a scene or an object; generating hologram information based on the 3D information; deriving a real number hologram function by extracting a real number part and an imaginary number part from the hologram information; determining an intermediate hologram function based on a sign characteristic of the real number hologram function; and determining encoded hologram information based on the intermediate hologram function.

The determining of the intermediate hologram function may include determining the intermediate hologram function by downscaling the real number hologram function if a value of the real number hologram function is a negative value; and determining the real number hologram function as the intermediate hologram function if the value of the real number hologram function is not the negative value.

The determining of the intermediate hologram function by downscaling may include downscaling the real number hologram function; retrieving a minimum value of the real number hologram function; and determining the intermediate hologram function based on the downscaled real number hologram function and the minimum value of the real number hologram function.

The determining of the hologram information may include retrieving a minimum value of the intermediate hologram function; and determining, as the encoded hologram information, a result acquired by subtracting a minimum value of the intermediate hologram function from the intermediate hologram function.

The 3D information may include at least one of color information and depth information of the scene or the object and 3D point cloud information.

According to an aspect of at least one example embodiment, there is provided a method of evaluating a holographic image quality, the method including separating hologram information into a left-eye hologram and a right-eye hologram; deriving a left-eye real number hologram function and a right-eye real number hologram function by extracting a real number part or an imaginary number part from each of the left-eye hologram and the right-eye hologram; determining a left-eye intermediate hologram function and a right-eye intermediate hologram function based on a sign characteristic of each of the left-eye real number hologram function and the right-eye real number hologram function; encoding the left-eye hologram and the right-eye hologram using the left-eye intermediate hologram function and the right-eye intermediate hologram function; reconstructing a 3D hologram on a display terminal using the encoded left-eye hologram and right-eye hologram; capturing the reconstructed 3D hologram; and deriving a brightness and a contrast ratio based on a grey level unit of the captured 3D hologram and measuring an image quality of the reconstructed 3D hologram.

The determining of the intermediate hologram function may include determining the intermediate hologram function by downscaling the real number hologram function if a value of the real number hologram function is a negative value; and determining the real number hologram function as the intermediate hologram function if the value of the real number hologram function is not the negative value.

The encoding may include retrieving a minimum value of the left-eye intermediate hologram function and a minimum value of the right-eye intermediate hologram function; determining, as the encoded left-eye hologram, a result acquired by subtracting the minimum value of the left-eye intermediate hologram function from the left-eye intermediate hologram function; and determining, as the encoded right-eye hologram, a result acquired by subtracting the minimum value of the right-eye intermediate hologram function from the right-eye intermediate hologram function.

The measuring may include measuring the image quality of the reconstructed 3D hologram based on a maximum brightness gray value and a background noise brightness gray value measured at first coordinates of the captured 3D hologram and a minimum brightness gray value and a background noise brightness gray value measured at second coordinates of the captured 3D hologram different from the first coordinates.

The holographic image quality evaluation method may further include correcting the encoded left-eye hologram and right-eye hologram based on a characteristic of the display terminal. The reconstructing may include reconstructing the 3D hologram using the corrected left-eye hologram and right-eye hologram.

According to an aspect of at least one example embodiment, there is provided a hologram encoding apparatus including a hologram information generator configured to generate hologram information based on 3D information of a scene or an object; and an encoder configured to derive a real number hologram function by extracting a real number part and an imaginary number part from the hologram information, to determine an intermediate hologram function based on a sign characteristic of the real number hologram function, and to determine encoded hologram information based on the intermediate hologram function.

The encoder may be configured to determine the intermediate hologram function by downscaling the real number hologram function if a value of the real number hologram function is a negative value, and to determine the real number hologram function as the intermediate hologram function if the value of the real number hologram function is not the negative value.

The encoder may be configured to downscale the real number hologram function, to retrieve a minimum value of the real number hologram function, and to determine the intermediate hologram function based on the downscaled real number hologram function and the minimum value of the real number hologram function.

The encoder may be configured to retrieve a minimum value of the intermediate hologram function and may determine, as the encoded hologram information, a result acquired by subtracting the minimum value of the intermedium hologram function from the intermediate hologram function.

According to an aspect of at least one example embodiment, there is provided an apparatus for evaluating a holographic image quality, the apparatus including an encoder configured to separate hologram information into a left-eye hologram and a right-eye hologram, to derive a left-eye real number hologram function and a right-eye real number hologram function by extracting a real number part or an imaginary number part from each of the left-eye hologram and the right-eye hologram, to determine a left-eye intermediate hologram function and a right-eye intermediate hologram function based on a sign characteristic of each of the left-eye real number hologram function and the right-eye real number hologram function, and to encode the left-eye hologram and the right-eye hologram using the left-eye intermediate hologram function and the right-eye intermediate hologram function; a terminal controller configured to reconstruct a 3D hologram on a display terminal using the encoded left-eye hologram and right-eye hologram; a capturer configured to capture the reconstructed 3D hologram; and an image quality measurer configured to derive a brightness and a contrast ratio based on a grey level unit of the captured 3D hologram and measuring an image quality of the reconstructed 3D hologram.

The image quality measurer may be configured to measure the image quality of the reconstructed 3D hologram based on a maximum brightness gray value and a background noise brightness gray value measured at first coordinates of the captured 3D hologram and a minimum brightness gray value and a background noise brightness gray value measured at second coordinates of the captured 3D hologram different from the first coordinates.

The terminal controller may be configured to correct the encoded left-eye hologram and right-eye hologram based on a characteristic of the display terminal, and to reconstruct the 3D hologram using the corrected left-eye hologram and right-eye hologram.

According to example embodiments, it is possible to produce and provide optimal high quality hologram content in a MAO holographic terminal system by determining encoded hologram information using a real number hologram function that is a result of extracting a real number part from hologram information, or a function transformed from the real number hologram function.

Also, according to example embodiments, it is possible to measure an image quality of a reconstructed 3D hologram by capturing and analyzing a reconstructed holographic image.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms used herein are to describe the example embodiments and are not construed as limiting. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

A hologram encoding method according to an example embodiment may be performed by a hologram encoding apparatus according to an example embodiment. Also, a holographic image quality evaluating method according to an example embodiment may be performed by a holographic image quality evaluation apparatus according to an example embodiment.

Figure 1:
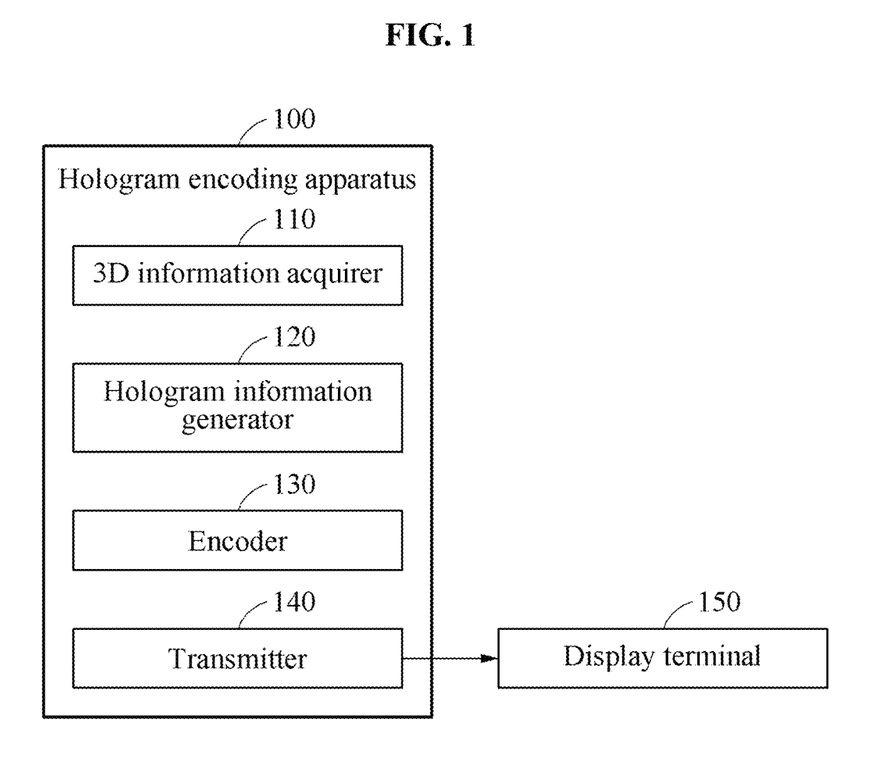
FIG. 1 is a diagram illustrating a hologram encoding apparatus according to an example embodiment.

FIG. 1 is a diagram illustrating a hologram encoding apparatus according to an example embodiment.

Referring to FIG. 1, a hologram encoding apparatus 100 may include a three-dimensional (3D) information acquirer 110, a hologram information generator 120, an encoder 130, and a transmitter 140. Here, the transmitter 140 may be a communication device. Each of the 3D information acquirer 110, the hologram information generator 120, and the encoder 130 may be a module configured to execute a program included in a different process or a single process.

The 3D information acquirer 110 may acquire 3D information of a scene or an object. Here, the 3D information may include at least one of color information and depth information of the scene or the object and 3D point cloud information.

Also, the 3D information acquirer 110 may receive 3D information of the scene or the object from a 3D camera in a wired or wireless manner, which is connected to the hologram encoding apparatus 100 in a wired/wireless manner, or may receive 3D information generated by a 3D camera present in a different place through a network.

The hologram information generator 120 may generate the hologram information based on the 3D information acquired by the 3D information acquirer 110. Here, the hologram information generator 120 may generate computer-generated hologram (CGH) information based on color information and depth information of the scene or the object in a red, green, blue (RGB) depth format or a point cloud format. Also, the hologram information generator 120 may generate the CGH information by separating the 3D information into a real number part and an imaginary number part and using a complex number transformed from at least one of the real number part and the imaginary number part. For example, the CGH information may be represented using a complex number transformed to [real number part of 3D information]+i*[imaginary number part of 3D information]. Here, i may be an imaginary number defined by $i=\sqrt{-1}$ or may be an imaginary number corresponding to $e^{\{i\pi/2\}}$.

When a 3D space including a 3D scene is set to be segmented into a plurality of hierarchies to generate hologram information, the hologram information generator 120 may cut the 3D space so that a hologram plane (H), an observing view-window plane (VW) of a viewer, and hierarchical layers may be in parallel with one another. The hologram information generator 120 may allocate continuously distributed point clouds to a layer closest thereto. To calculate a complex field on the hologram plane, the hologram information generator 120 may perform an inconsecutive Fourier transformation using a fast Fourier transformation (FFT) algorithm.

For example, the hologram information generator 120 may generate hologram information $U_H(x,y)$ using an FFT-based CGH equation as represented by the following Equation 1.

$$U_{VW}(u, v) = \sum_{i=1}^{m} \frac{e^{\frac{\pi j}{\lambda d_i}(u^2+v^2)}}{j\lambda d_i} \frac{f}{d_i} \int\int U_i(x_i, y_i) e^{\frac{-2\pi j}{\lambda d_i}(ux_i+vy_i)} dx_i dy_i,$$

$$U_H(x, y) = \frac{j}{\lambda f} \int\int U_{VW}(u, v) e^{-\frac{\pi j}{\lambda f}(u^2+v^2)} e^{\frac{2\pi j}{\lambda f}(xu+yv)} du dv,$$

[Equation 1]

In Equation 1, (u, v) denotes an observing view-window plane of the viewer and $(x_i, y_i)$ denotes an $i^{th}$ layer of a 3D scene. Also, $U_i$ denotes an object field of the $i^{th}$ layer, f denotes a focal length of a field lens, λ denotes a wavelength of illuminance, and $d_i$ denotes a viewing distance from the hologram plane.

Since the hologram information is complex-valued information, the hologram information may not be immediately uploaded to the display terminal 150. Accordingly, the encoder 130 may perform encoding to transform the hologram information to be suitable for the display terminal 150.

The encoder 130 may derive a real number hologram function by extracting a real number part or an imaginary number part from the hologram information. The encoder 130 may determine an intermediate hologram function based on a sign characteristic of the real number hologram function.

Here, if a value of the real number hologram function is a negative value, the encoder 130 may determine the intermediate hologram function by downscaling the real number hologram function. Also, the encoder 130 may downscale the real number hologram function, may retrieve a minimum value of the real number hologram function, and may determine the intermediate hologram function based on the downscaled real number hologram function and the minimum value of the real number hologram function.

Also, if the value of the real number hologram function is not the negative value, the encoder 130 may determine the real number hologram function as the intermediate hologram function.

The encoder 130 may determine encoded hologram information based on the intermediate hologram function. Here, the encoder 130 may retrieve a minimum value of the intermediate hologram function, and may determine, as the encoded hologram information, a result acquired by subtracting the minimum value of the intermediate hologram function from the intermediate hologram function.

The transmitter 140 may transmit the encoded hologram information to the display terminal 150.

The display terminal 150 may reconstruct a holographic image by outputting the hologram information to a spatial light modulator (SLM) of an amplitude modulation (AM) scheme. Here, the hologram information may include a left-eye hologram and a right-eye hologram, and the display terminal 150 may include a left-eye SLM corresponding to the left-eye hologram and a right-eye SLM corresponding to the right-eye hologram.

The display terminal 150 may allow a light output from an optical device to be incident to each of the left-eye SLM and the right-eye SLM, and may reconstruct the left-eye hologram and the right-eye hologram on a 3D space using the light modulated and thereby output from each of the left-eye SLM and the right-eye SLM.

Also, the display terminal 150 may include an image separation function of separating the received hologram information into the left-eye hologram and the right-eye hologram to be incident to the left-eye SLM and the right-eye SLM, respectively, or allowing the received left-eye hologram and right-eye hologram to be incident to the left-eye SLM and the right-eye SLM, respectively. Here, the display terminal 150 may allow outputs of the left-eye SLM and the right-eye SLM to be incident to a left eye and a right eye of the user, respectively, by controlling locations and directions of lights output from the left-eye SLM and the right-eye SLM based on locations of the left eye and the right eye of the user, respectively, using a field lens. For example, the field lens may be a lens having optical transparency of converging the lights output from the left-eye SLM and the right-eye SLM to the locations of the left eye and the right eye of the user, respectively. Here, the field lens may transfer an optically reconstructed field to be around the left eye and the right eye of the user by converging the lights to the locations of the left eye and the right eye of the user, respectively. Also, the field lens may be provided to form an optically reconstructed 3D hologram in a back space of an SLM.

Also, the display terminal 150 may be one of a binocular stereo holographic display and various types of personal wearable terminals, for example, a virtual reality (VR) terminal and an augmented reality (AR) terminal.

The hologram encoding apparatus 100 may produce and provide optimal high quality hologram content in a modified amplitude-only (MAO) holographic terminal system by determining encoded hologram information using a real number hologram function or a function transformed from the real number hologram function.

Accordingly, the hologram encoding apparatus 100 may optimally adapt to the display terminal 150 that includes the MAO holographic terminal system and may provide a real-time immersion and 3D AR effect to a user using the display terminal 150.

Also, the hologram encoding apparatus 100 may determine the encoded hologram information using the real number hologram function or the function transformed from the real number hologram function and thus, may overcome some constraints coming from production of passive hologram content by the conventional computer hologram generation and may also create highly efficient hologram content having a relatively high contrast ratio and high brightness compared to those of the conventional hologram content.

Figure 2:
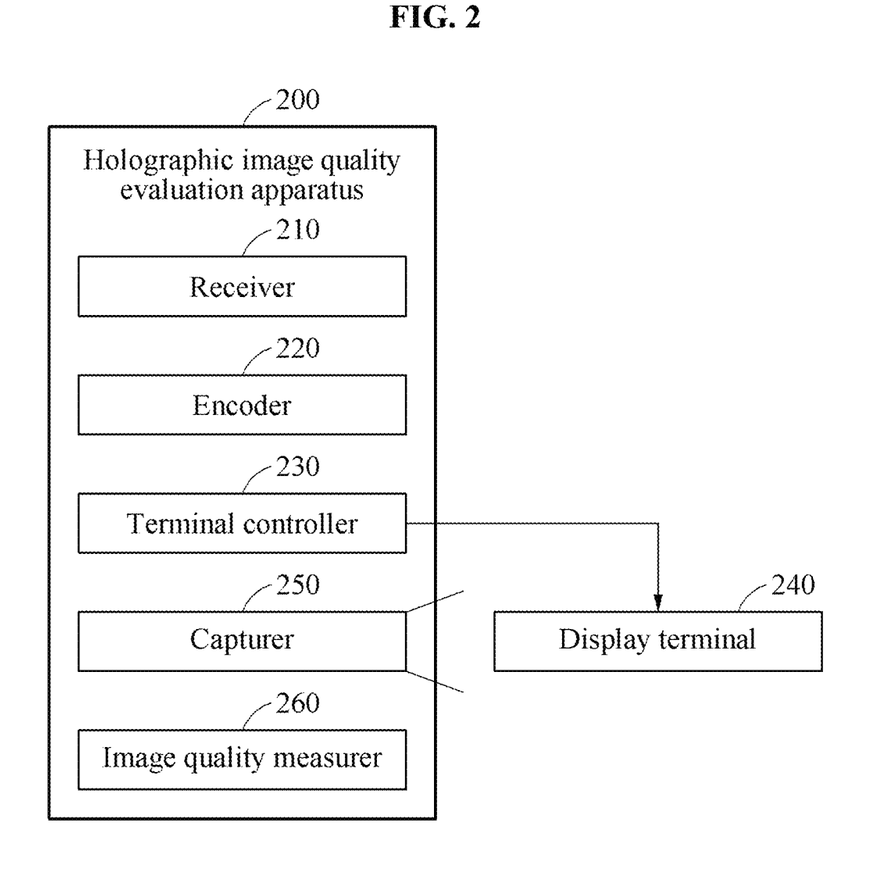
FIG. 2 is a diagram illustrating an apparatus for evaluating a holographic image quality according to an example embodiment.

FIG. 2 is a diagram illustrating a holographic image quality evaluation apparatus according to an example embodiment.

Referring to FIG. 2, a holographic image quality evaluation apparatus 200 may include a receiver 210, an encoder 220, a terminal controller 230, a capturer 250, and an image quality measurer 260. Here, the receiver 210 may be a communication device. Each of the encoder 220, the terminal controller 230, the capturer 250, and the image quality measurer 260 may be a module configured to execute a program included in a different process or a single process.

The receiver 210 may receive hologram information from the hologram information generator 120 or a sperate hologram information generation apparatus.

The encoder 220 may separate the hologram information received by the receiver 210 into a left-eye hologram and a right-eye hologram. The encoder 220 may derive a left-eye real number hologram function and a right-eye real number hologram function by extracting a real number part or an imaginary number part from each of the left-eye hologram and the right-eye hologram.

The encoder 220 may determine a left-eye intermediate hologram function and a right-eye intermediate hologram function based on a sign characteristic of each of the left-eye real number hologram function and the right-eye real number hologram function. If a value of the real number hologram function is a negative value, the encoder 220 may determine the intermediate hologram function by downscaling the real number hologram function. Also, if the value of the real number hologram function is not the negative value, the encoder 220 may determine the real number hologram function as the intermediate hologram function.

The encoder 220 may encode the left-eye hologram and the right-eye hologram using the left-eye intermediate hologram function and the right-eye intermediate hologram function. Here, the encoder 220 may retrieve a minimum value of the left-eye intermediate hologram function and a minimum value of the right-eye intermediate hologram function. The encoder 220 may determine, as the encoded left-eye hologram, a result acquired by subtracting the minimum value of the left-eye intermediate hologram function from the left-eye intermediate hologram function. Also, the encoder 220 may determine, as the encoded right-eye hologram, a result acquired by subtracting the minimum value of the right-eye intermediate hologram function from the right-eye intermediate hologram function.

The terminal controller 230 may reconstruct a 3D hologram on a display terminal 240 using the left-eye hologram and the right-eye hologram encoded by the encoder 220. Here, the terminal controller 230 may correct the encoded left-eye hologram and right-eye hologram based on a characteristic of the display terminal 240 and may reconstruct the 3D hologram using the corrected left-eye hologram and right-eye hologram.

The capturer 250 may capture the 3D hologram reconstructed on the display terminal 240 with a camera.

The image quality measurer 260 may derive a brightness and a contrast ratio based on a grey level unit of the 3D hologram captured by the capturer 250 and may measure an image quality of the 3D hologram reconstructed on the display terminal 240.

Here, the image quality measurer 260 may measure the image quality of the 3D hologram reconstructed on the display terminal 240 based on a maximum brightness grey value and a background noise brightness gray value measured at first coordinates of the captured 3D hologram and a minimum brightness gray value and a background noise brightness gray value measured at second coordinates of the captured 3D hologram different from the first coordinates.

Also, the encoder 220 may encode the encoded hologram information with the same method as that of the encoder 130 of FIG. 1. Here, the terminal controller 230 may extract the encoded left-eye hologram and right-eye hologram from the encoded hologram information and may reconstruct the 3D hologram on the display terminal 240.

Depending on example embodiments, the terminal controller 230, the capturer 250, and the image quality measurer 260 may be included in the hologram encoding apparatus 100 instead of including the transmitter 140 in the hologram encoding apparatus 100. Alternatively, instead of including the receiver 210, the 3D information acquirer 110 and the hologram information generator 120 may be included in the holographic image quality evaluation apparatus 200. That is, hologram encoding and evaluation of the holographic image quality may be performed using a single apparatus.

Figure 3:
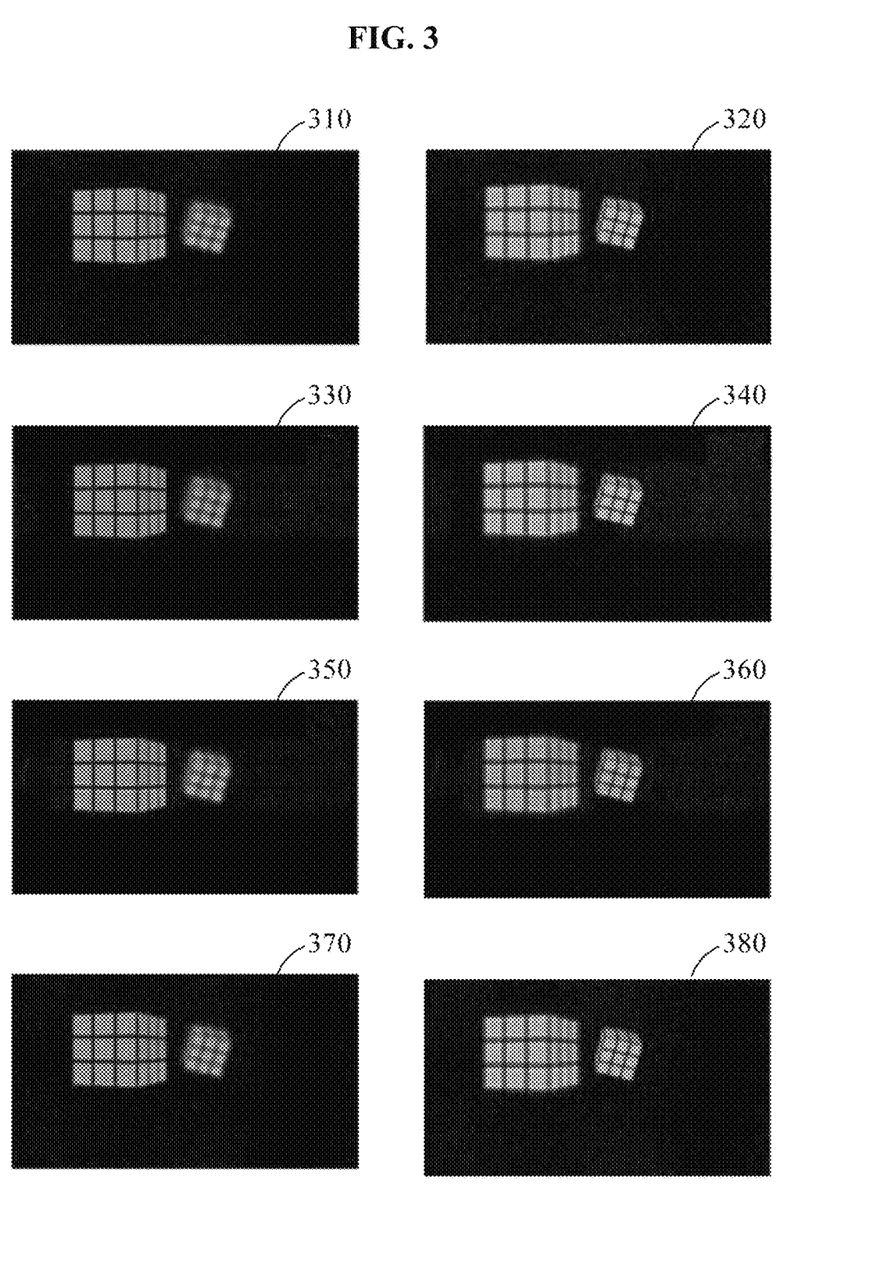
FIG. 3 illustrates examples of a hologram encoding result according to an example embodiment.

FIG. 3 illustrates examples of a hologram encoding result according to an example embodiment.

In FIG. 3, it is assumed that a parallax angle between a left-eye hologram and a right-eye hologram is 5°. Also, left-eye holograms and right-eye holograms of FIG. 3 may be encoded using a conventional amplitude-only (CAO) encoding method, a Burckhardt encoding method, a Lee encoding method, and according to an example embodiment.

The CAO encoding method may calculate CAO-encoded hologram information $H_{CAO}(x, y)$ by extracting only a real number part $H_R(x, y)$ from complex-valued hologram information and by generating an extraction result into a positive value. That is, if a minimum value is a negative value, the CAO encoding method may have a positive value by subtracting the minimum value that is the negative value from the real number part $H_R(x, y)$ and may calculate the CAO-encoded hologram information $H_{CAO}(x, y)$. Also, the CAO encoding method may have a positive value using a correction term and may calculate the CAO-encoded hologram information $H_{CAO}(x, y)$. For example, the CAO encoding method may calculate the CAO-encoded hologram information $H_{CAO}(x, y)$ according to the following Equation 2.

$$H_{CAO}(x,y)=H_R(x,y)+H_{off} \qquad \text{[Equation 2]}$$

The real number part $H_R(x, y)$ of the hologram information may be determined according to the following Equation 3.

$$H_R(x,y)=|H(x,y)|\cos \Phi(x,y) \qquad \text{[Equation 3]}$$

Also, $H_{off}$ may be a correction term so that $H_{CAO}(x, y)$ may not have a negative value and denotes an absolute value of the minimum value of the real number part $H_R(x, y)$ of the hologram information as represented by the following Equation 4.

$$H_{off}=|\min\{H_R(x,y)\}| \qquad \text{[Equation 4]}$$

Referring to FIG. 3, a left-eye hologram 310 may refer to a CAO-encoded left-eye hologram and a right-eye hologram 320 may refer to a CAO-encoded right-eye hologram.

The Burckhardt encoding method refers to an encoding method that decomposes complex-valued hologram information into three non-negative real values. For example, hologram information $H_B(x, y)$ encoded using the Burckhardt encoding method may be calculated according to the following Equation 5.

$$H_B(x,y)=B_1(x,y)e^{i0}+B_2(x,y)e^{i2\pi/3}+B_3(x,y)e^{i4\pi/3} \qquad \text{[Equation 5]}$$

In Equation 5, $B_i(x, y)$ denotes a non-negative real value and at least one of $B_1(x, y)$, $B_2(x, y)$, and $B_3(x, y)$ may be 0. Referring again to FIG. 3 a left-eye hologram 330 may refer to a left-eye hologram encoded using the Burckhardt encoding method and a right-eye hologram 340 may refer to a right-eye hologram encoded using the Burckhardt encoding method.

The Lee encoding method refers to an encoding method that decomposes complex-valued hologram information into four non-negative real values. For example, hologram information $H_B(x, y)$ encoded using the Lee encoding method may be calculated according to the following Equation 6.

$$H_L(x,y)=L_1(x,y)e^{i0}+L_2(x,y)e^{i\pi/2}+L_3(x,y)e^{i\pi}+L_4(x,y)e^{i3\pi/2} \qquad \text{[Equation 6]}$$

In Equation 6, $L_i(x, y)$ denotes be a non-negative real value and at least two of $L_1(x, y)$, $L_2(x, y)$, $L_3(x, y)$, and $L_4(x, y)$ may be 0. Referring again to FIG. 3, a left-eye hologram 350 may refer to a left-eye hologram encoded using the Lee encoding method and a right-eye hologram 360 may be a right-eye hologram encoded using the Lee encoding method.

The CAO encoding method, the Burckhardt encoding method, and the Lee encoding method may not provide an excellent brightness and contrast ratio simultaneously. The left-eye hologram 310 and the right-eye hologram 320 of the CAO encoding method may have a relatively high brightness compared to those of the Burckhardt encoding method and the Lee encoding method, however, may have a relatively low contrast ratio compared to those of the Burckhardt encoding method and the Lee encoding method due to significantly great background noise.

Also, the left-eye hologram 330 and the right-eye hologram 340 of the Burckhardt encoding method and the left-eye hologram 350 and the right-eye hologram 360 of the Lee encoding method may have a relatively high contrast ratio, however, may have a relatively low brightness compared to the left-eye hologram 310 and the right-eye hologram 320 of the CAO encoding method.

Referring again to FIG. 3, a left-eye hologram 370 may refer to a left-eye hologram encoded according to an example embodiment and a right-eye hologram 380 may refer to a right-eye hologram encoded according to an example embodiment.

Comparing the left-eye hologram 370 and the right-eye hologram 380 to the left-eye hologram 310 and the right-eye hologram 320 of the CAO encoding method, the left-eye hologram 330 and the right-eye hologram 340 of the Burckhardt encoding method, and the left-eye hologram 350 and the right-eye hologram 360 of the Lee encoding method, a MAO encoding method performed by the encoder 130 and the encoder 220 according to an example embodiment may maintain a brightness to be high at a CAO encoding level and may also maintain a contrast ratio to be high at a Burckhardt encoding level or a Lee encoding level.

For example, if a minimum value of a real number hologram function $H_R(x, y)$ is a negative value, the encoder 130 and the encoder 220 may calculate hologram information $H_{MAO}(x, y)$ encoded using the MAO encoding method according to the following Equation 7.

$$H_{MAO}(x,y)=H_{int}(x,y)-\min\{H_{int}(x,y)\} \quad \text{[Equation 7]}$$

Here, an intermediate function $H_{int}(x, y)$ may be defined as represented by Equation 8.

$$H_{int}(x, y) = \begin{cases} H_R(x, y) & \text{for } H_R \geq 0, \\ \varepsilon H_R(x, y)/\min\{H_R(x, y)\} & \text{for } H_R < 0. \end{cases} \quad \text{[Equation 8]}$$

Here, $0 < \varepsilon \leq 1$.

According to Equation 8, if real number hologram function $H_R(x, y) \geq 0$, the encoder 130 and the encoder 220 may determine the real number hologram function $H_R(x, y)$ as the intermediate function $H_{int}(x, y)$.

Also, if the real number hologram function $H_R(x, y)$ is a negative value less than 0, the encoder 130 and the encoder 220 may perform a downscaling process, that is, $\varepsilon \times H_R(x, y)$ with respect to hologram information. If $0 < \varepsilon < 1$, a downscaling effect of a fixed ratio may be determined based on $\varepsilon$. As shown in Equation 8, the encoder 130 and the encoder 220 may determine, as the intermediate function $H_{int}(x, y)$, a result value acquired by dividing $\varepsilon \times H_R(x, y)$ by minimum value $\min\{H_R(x, y)\}$ of real number hologram function $H_R$.

Figure 4:
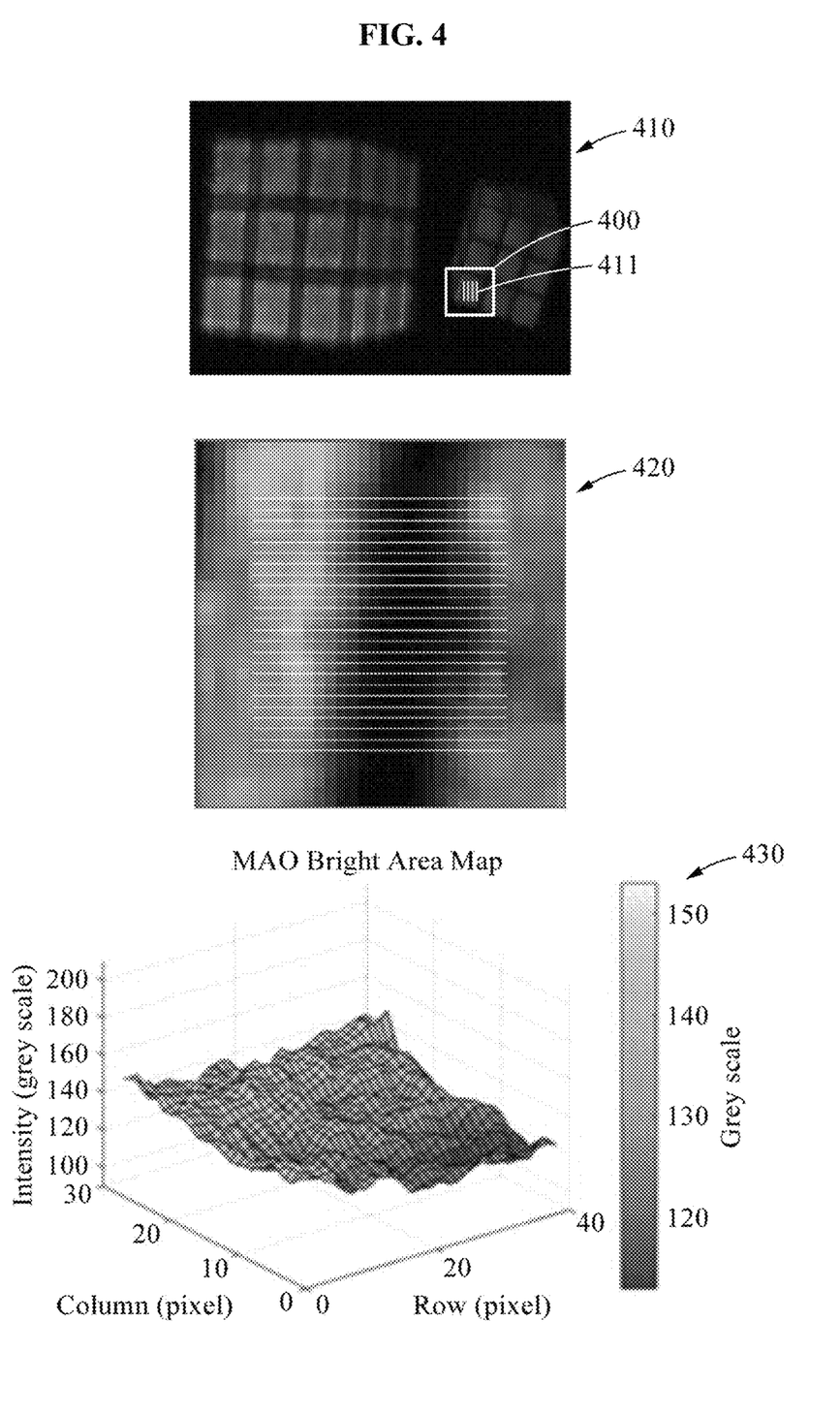
FIG. 4 illustrates examples of a holographic image quality evaluation result according to an example embodiment.

FIG. 4 illustrates examples of a holographic image quality evaluation result according to an example embodiment.

The image quality measurer 260 may scan pixels 411 included in a selection area 400 of a 3D holographic image 410 captured by the capturer 250 and may evaluate quality of the scanned pixels 411. The pixels 411 included in the selection area 400 may be scanned along 24 lines vertically disposed at preset intervals as shown in an image 420.

The image quality measurer 260 may represent a gray level value scanned from each of the 24 lines based on a location (x) as shown in a graph 430. The image quality measurer 260 may derive a holographic contrast ratio (HCR) and a brightness from each of gray level curves and may analyze a holographic image quality performance of the 3D holographic image 410.

For example, the image quality measurer 260 may calculate the HCR according to the following Equation 9. The image quality measurer 260 may determine a background noise prohibition level of a 3D hologram reconstructed on the display terminal 150 or the display terminal 240 based on the HCR.

$$HCR_{ij}=(GW_i-GO_i)/GB_j-GO_j) \quad \text{[Equation 9]}$$

In Equation 9, $GW_i$ denotes a maximum brightness gray value measured at coordinates $(x_i, y_i)$ of the 3D holographic image 410 and $GO_i$ denotes a background noise gray value measured at coordinates $(x_i, y_i)$ of the 3D holographic image 410. Here, a value of a numerator calculated using $GW_i$ and $GO_i$ may be a holographic brightness. For example, if the 3D holographic image 410 includes 8 bits, the holographic brightness may have a gray value between 0 and 255. Also, diffraction efficiency of a hologram may be in proportion to a holographic brightness value.

Also, $GB_j$ denotes a minimum brightness gray value measured at coordinates $(x_j, y_j)$ of the 3D holographic image 410 and $GO_j$ denotes a background noise brightness gray value measured at coordinates $(x_j, y_j)$ of the 3D holographic image 410.

Figure 5:
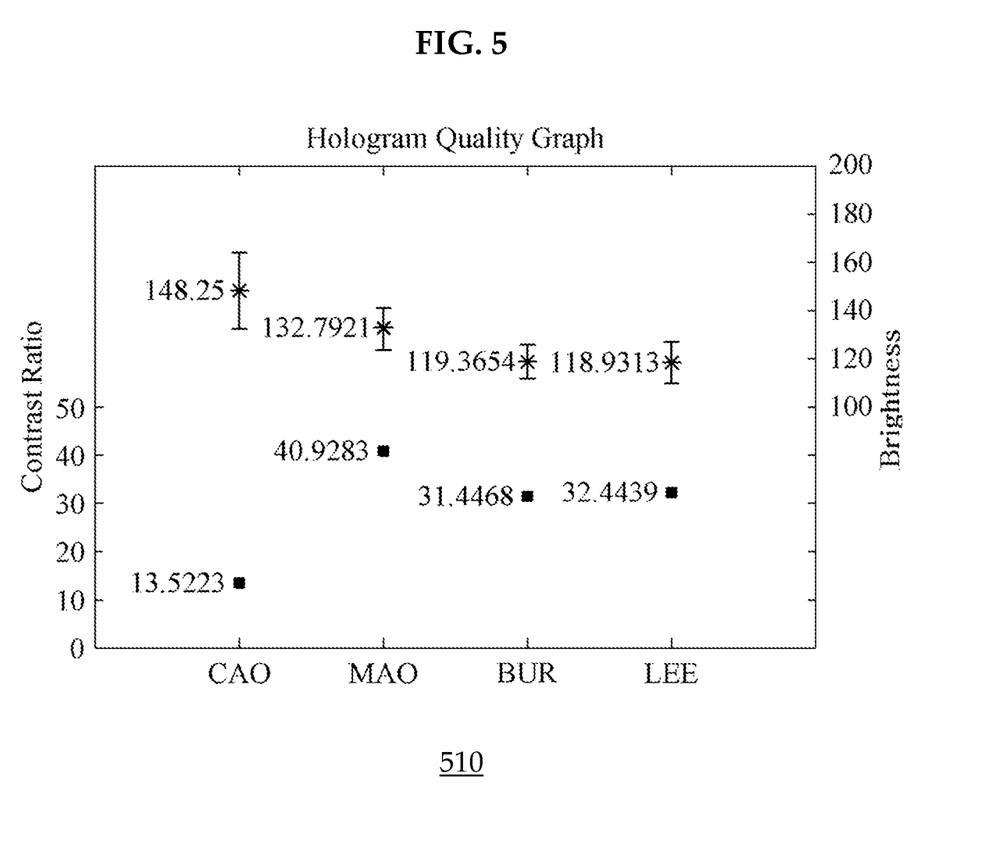
FIG. 5 is a graph showing an example of a result of evaluating image qualities of left-eye holograms and right-eye holograms of FIG. 3.

FIG. 5 illustrate examples of a result of evaluating image qualities of left-eye holograms and right-eye holograms of FIG. 3.

Here, a graph 510 shows a result of evaluating image qualities of the left-eye hologram 310, the left-eye hologram 330, the left-eye hologram 350, and the left-eye hologram 370.

Referring to FIG. 5, a brightness of the CAO encoding method may be higher by about twice than that of the Burckhardt encoding method or the Lee encoding method. An HCR of the Burckhardt encoding method may be higher by about 3.5 times than that of the CAO encoding method. Also, the Burckhardt encoding method requires a more number of samplings compared to the Lee encoding method and thus, may have a brightness and an HCR higher than those of the Lee encoding method.

Referring again to FIG. 5, the MAO encoding method performed by the encoder 130 and the encoder 220 may have a relatively high brightness compared to the Burckhardt encoding method and the Lee encoding method, which may be a level similar to that of the CAO encoding method, and may have a relatively high HCR compared to the CAO encoding method, the Burckhardt encoding method, and the Lee encoding method.

That is, the MAO encoding method may have a relatively high HCR compared to the conventional encoding methods and may also have a brightness at a level similar to that of the CAO encoding method exhibiting the lowest HCR and the highest brightness among the conventional encoding methods. Accordingly, the MAO encoding method may have a high value with respect to all of the brightness and the HCR.

Figure 6:
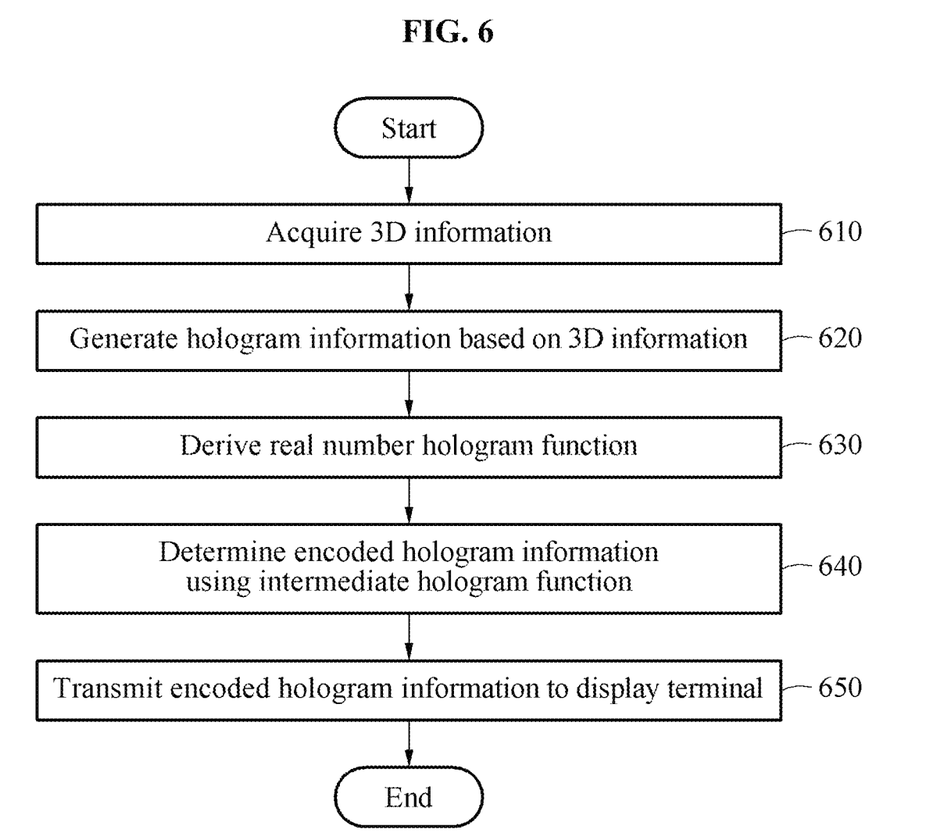
FIG. 6 is a flowchart illustrating a hologram encoding method according to an example embodiment.

FIG. 6 is a flowchart illustrating a hologram encoding method according to an example embodiment.

Referring to FIG. 6, in operation 610, the 3D information acquirer 110 may acquire 3D information of a scene or an object. Here, the 3D information may include at least one of color information and depth information of the scene or the object and 3D point cloud information.

In operation 620, the hologram information generator 120 may generate hologram information based on the 3D information acquired in operation 610.

In operation 630, the encoder 130 may derive a real number hologram function by extracting a real number part or an imaginary number part from the hologram information generated in operation 620. The encoder 130 may determine an intermediate hologram function based on a sign characteristic of the real number hologram function.

In operation 640, the encoder 130 may determine encoded hologram information based on the intermediate hologram function determined in operation 630. Here, the encoder 130 may determine, as the encoded hologram information, a result acquired by subtracting a minimum value of the intermediate hologram function from the intermediate hologram function.

In operation 650, the transmitter 140 may transmit the encoded hologram information to the display terminal 150.

Figure 7:
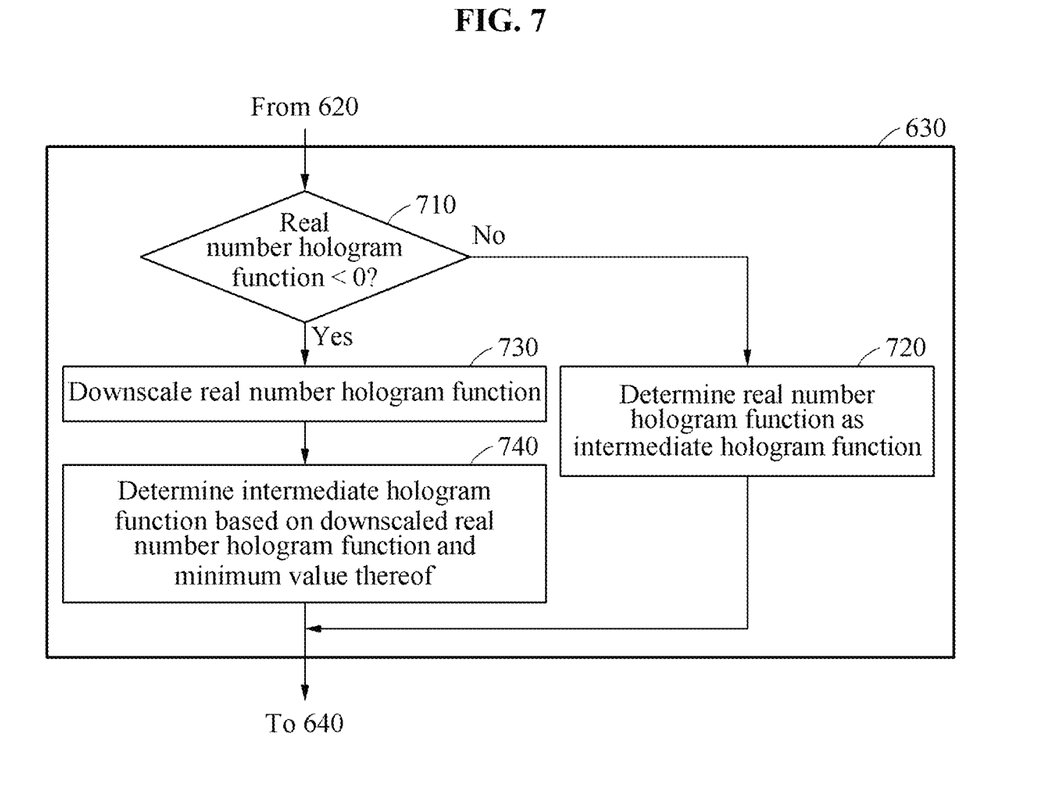
FIG. 7 is a flowchart illustrating a process of determining an intermediate hologram function according to an example embodiment.

FIG. 7 is a flowchart illustrating a process of determining an intermediate hologram function according to an example embodiment. Operations 710 through 740 of FIG. 7 may be included in operation 630 of FIG. 6.

Referring to FIG. 7, in operation 710, the encoder 130 may verify whether the real number hologram function is a negative value. If the real number hologram function is the negative value (Yes), the encoder 130 may perform operation 730. Conversely, if the real number hologram function is not the negative value (No), the encoder 130 may perform operation 720.

In operation 720, the encoder 130 may determine the real number hologram function as the intermediate hologram function.

In operation 730, the encoder 130 may downscale the real number hologram function.

In operation 740, the encoder 130 may determine the intermediate hologram function based on the downscaled real number hologram function and a minimum value of the real number hologram function.

Figure 8:
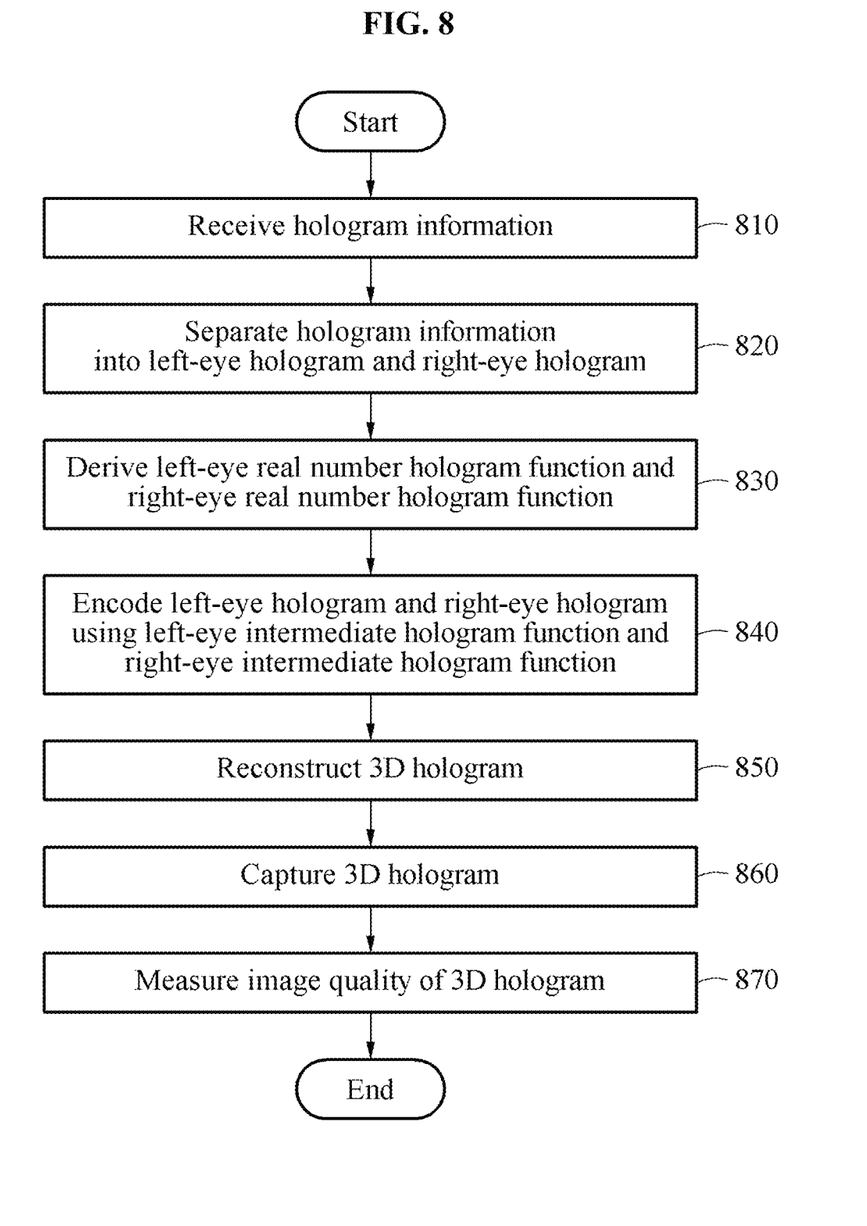
FIG. 8 is a flowchart illustrating a method of evaluating a holographic image quality according to an example embodiment.

FIG. 8 is a flowchart illustrating a method of evaluating a holographic image quality according to an example embodiment.

Referring to FIG. 8, in operation 810, the receiver 210 may receive hologram information from the hologram information generator 120 or a separate hologram information generation apparatus.

In operation 820, the encoder 220 may separate the received hologram information into a left-eye hologram and a right-eye hologram.

In operation 830, the encoder 220 may derive a left-eye real number hologram function and a right-eye real number hologram function by extracting a real number part or an imaginary number part from each of the left-eye hologram and the right-eye hologram. The encoder 220 may determine a left-eye intermediate hologram function and a right-eye intermediate hologram function based on a sign characteristic of each of the left-eye real number hologram function and the right-eye real number hologram function.

In operation 840, the encoder 220 may encode the left-eye hologram and the right-eye hologram using the left-eye intermediate hologram function and the right-eye intermediate hologram function determined in operation 830.

In operation 850, the terminal controller 230 may reconstruct a 3D hologram on the display terminal 240 using the left-eye hologram and the right-eye hologram encoded in operation 840. Here, the terminal controller 230 may correct the encoded left-eye hologram and right-eye hologram based on a characteristic of the display terminal 240 and may reconstruct the 3D hologram using the corrected left-eye hologram and right-eye hologram.

In operation 860, the capturer 250 may capture the reconstructed 3D hologram with a camera.

In operation 870, the image quality measurer 260 may measure an image quality of the reconstructed 3D hologram based on a maximum brightness gray value and a background noise brightness gray value measured at first coordinates of the captured 3D hologram and a minimum brightness gray value and a background noise brightness gray value measured at second coordinates of the captured 3D hologram different from the first coordinates.

According to example embodiments, it is possible to produce and provide optimal high quality hologram content in a MAO holographic terminal system by determining encoded hologram information using a real number hologram function that is a result of extracting a real number part from hologram information, or a function transformed from the real number hologram function.

Also, the example embodiments may optimally adapt to the display terminal 150 that includes the MAO holographic terminal system and may provide a real-time immersion and 3D AR effect to a user using the display terminal 150.

Also, according to example embodiments, it is possible to measure an image quality of a reconstructed 3D hologram by capturing and analyzing a reconstructed holographic image.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An amplitude-modulated (AM) hologram encoding method comprising:
   acquiring three-dimensional (3D) information of a scene or an object;
   generating hologram information based on the 3D information, the hologram information comprising a plurality of complex values, each complex value including a real number part and an imaginary number part;
   deriving a real number hologram function comprising a first plurality of real values by determining respective real values for the plurality of complex values of the hologram information;
   determining a sign characteristic indicating whether the first plurality of real values includes a real value that is less than zero;
   determining an intermediate hologram function including a second plurality of real values based on the sign characteristic and the first plurality of real values; and
   determining encoded hologram information based on the intermediate hologram function, the encoded hologram information including a third plurality of real values and being adapted for use by a display device using an AM scheme,
   wherein determining the intermediate hologram function comprises:
      determining a minimum value of the first plurality of real values, and
      when the sign characteristic indicates that the first plurality of real values includes a real value that is less than zero, determining the second plurality of real values by determining positive real values for each real value of the first plurality of real values by:
         determining the positive real values as being equal to the real value when the real value is equal to or greater than zero, and
         determining the positive real value by scaling the real number value by a fixed ratio greater than zero and less than 1 and dividing the scaled real value by the minimum value when the real number value is less than zero.

2. The method of claim 1, wherein determining the intermediate hologram function comprises:
   determining the real number hologram function as the intermediate hologram function when the sign characteristic indicates that the first plurality of real values does not include a real value that is less than zero.

3. The method of claim 1, wherein determining the encoded hologram information comprises:
   determining a minimum value of the second plurality of real values; and
   determining the third plurality of real values by subtracting the minimum value from the second plurality of real values, respectively.

4. The method of claim 1, wherein the 3D information comprises at least one of:
   color information and depth information of the scene or the object, and
   three-dimensional (3D) point cloud information.

5. A hologram encoding apparatus comprising:
   a processor, wherein the hologram encoding apparatus is configured to:
   receive hologram information based on three-dimensional (3D) information of a scene or an object, the hologram information comprising a plurality of complex values, each complex value including a real number part and an imaginary number part; and
   derive a real number hologram function comprising a first plurality of real values by determining respective real values for the plurality of complex values of the hologram information,
   determine a sign characteristic indicating whether any of the first plurality of real values is less than zero;
   determine an intermediate hologram function including a second plurality of real values based on the sign characteristic and the first plurality of real values, and
   determine encoded hologram information based on the intermediate hologram function, the encoded hologram information including a third plurality of real values,
   wherein determining the intermediate hologram function comprises:
      determining a minimum value of the first plurality of real values, and
      when the sign characteristic indicates that the first plurality of real values includes a real value that is less than zero, determining the second plurality of real values by determining positive real values for each real value of the first plurality of real values by:
         determining the positive real values as being equal to the real value when the real value is equal to or greater than zero, and
         determining the positive real value by scaling the real number value by a fixed ratio greater than zero and less than 1 and dividing the scaled real value by the minimum value when the real number value is less than zero.

6. The hologram encoding apparatus of claim 5, wherein determining the intermediate hologram function comprises:
   determining the real number hologram function as the intermediate hologram function when the sign characteristic indicates that the first plurality of real values does not include a real value that is less than zero.

7. The hologram encoding apparatus of claim 5, wherein determining the encoded hologram information comprises:

determining a minimum value of the second plurality of real values, and determining the third plurality of real values by subtracting the minimum value from the second plurality of real values, respectively.

\* \* \* \* \*